US008553682B2

(12) United States Patent  
Shaheen

(10) Patent No.: US 8,553,682 B2  
(45) Date of Patent: *Oct. 8, 2013

(54) METHOD AND APPARATUS FOR SUPPORTING CIRCUIT SWITCHED INTERWORKING

(75) Inventor: Kamel M. Shaheen, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,321

(22) Filed: Jan. 12, 2012

(65) Prior Publication Data

US 2012/0113900 A1    May 10, 2012

Related U.S. Application Data

(63) Continuation of application No. 11/627,432, filed on Jan. 26, 2007, now Pat. No. 8,149,820.

(60) Provisional application No. 60/763,639, filed on Jan. 31, 2006.

(51) Int. Cl.
   *H04L 12/66* (2006.01)
   *H04W 4/00* (2009.01)

(52) U.S. Cl.
   USPC ............................................ 370/352; 370/328

(58) Field of Classification Search
   None
   See application file for complete search history.

(56) References Cited

U.S. PATENT DOCUMENTS

| 5,530,722 | A | 6/1996 | Dent |
|---|---|---|---|
| 2004/0073685 | A1 | 4/2004 | Hedin et al. |
| 2004/0208168 | A1 | 10/2004 | Masuda |
| 2004/0252674 | A1 | 12/2004 | Soininen et al. |
| 2005/0025047 | A1 | 2/2005 | Bodin et al. |
| 2005/0060411 | A1 | 3/2005 | Coulombe et al. |
| 2006/0007900 | A1 | 1/2006 | Sylvain |
| 2006/0268781 | A1 | 11/2006 | Svensson et al. |
| 2006/0285537 | A1 | 12/2006 | Mahdi |
| 2007/0002840 | A1 | 1/2007 | Song et al. |
| 2007/0058789 | A1 | 3/2007 | Lim et al. |
| 2007/0133563 | A1 | 6/2007 | Hundscheidt et al. |
| 2007/0217423 | A1 | 9/2007 | Hoffmann et al. |
| 2008/0298353 | A1 | 12/2008 | Zhu et al. |
| 2008/0316998 | A1 | 12/2008 | Procopio et al. |

FOREIGN PATENT DOCUMENTS

| EP | 1 551 135 | 7/2005 |
|---|---|---|
| JP | 2003-309668 | 10/2003 |
| WO | 02/080586 | 10/2002 |
| WO | 2004/112415 | 12/2004 |
| WO | 2005/011207 | 2/2005 |
| WO | 2005/025196 | 3/2005 |

(Continued)

OTHER PUBLICATIONS

Ericsson, "Introducing CSI Interworking for CSI Origination to IMS Termination", 23.279 CR 0024, Rev.2, Current Version 7.4.0, 3GPP TSG-SA2 Meeting #55, S2-064074, (Busan, Korea, Oct. 23-27, 2006).

(Continued)

*Primary Examiner* — Marcus R Smith
(74) *Attorney, Agent, or Firm* — Volpe and Koenig, P.C.

(57) ABSTRACT

A wireless transmit/receive unit communicates with a second wireless transmit/receive unit in a combined circuit switched (CS) session and an IP multimedia core network subsystem (IMS) session, where the second wireless transmit/receive unit uses VoIP.

10 Claims, 2 Drawing Sheets

(56) References Cited

FOREIGN PATENT DOCUMENTS

| WO | 2005/027460 | 3/2005 |
|---|---|---|
| WO | 2005/104600 | 11/2005 |
| WO | 2006/037375 | 4/2006 |

OTHER PUBLICATIONS

Siemens AG, "Realisierung Eines Combinational Service: CSI Video Telephony", IP.com Journal, (Jan. 16, 2006).

Third Generation Partnership Project, "Technical Specification Group Services and System Aspects; Study on Handling the Termination of Real-Time Sessions and Calls (Release 7)", 3GPP TR 23.8xx Draft V0.0.0 (Jan. 2006).

Third Generation Partnership Project, "Technical Specification Group Services and System Aspects; Study on Handling the Termination of Real-Time Sessions and Calls (Release 7)", 3GPP TR 23.819 V1.3.0 (Oct. 2006).

Third Generation Partnership Project, "Technical Specification Group Core Network and Terminals; Combining CS Calls and IMS Sessions; Stage 3 (Release 7)", 3GPP TR 24.879 V1.1.0 (Jan. 2006).

Third Generation Partnership Project, "Technical Specification Group Services and System Aspects; Combining Circuit Switched (CS) and IP Multimedia Subsystem (IMS) services; Stage 2 (Release 7)," 3GPP TS 23.279 V7.1.0 (Dec. 2005).

Third Generation Partnership Project, "Technical Specification Group Services and System Aspects; Combining Circuit Switched (CS) and IP Multimedia Subsystem (IMS) services; Stage 2 (Release 7)," 3GPP TS 23.279 V7.5.0 (Dec. 2006).

Third Generation Partnership Project, "Technical Specification Group Services and System Aspects; IP Multimedia Subsystem (IMS); Stage 2 (Release 6)," 3GPP TS 23.228 V6.15.0 (Sep. 2006).

Third Generation Partnership Project, "Technical Specification Group Services and System Aspects; IP Multimedia Subsystem (IMS); Stage 2 (Release 6)," 3GPP TS 23.228 V6.12.0 (Dec. 2005).

Third Generation Partnership Project, "Technical Specification Group Services and System Aspects; IP Multimedia Subsystem (IMS); Stage 2 (Release 7)," 3GPP TS 23.228 V7.6.0 (Dec. 2006).

Third Generation Partnership Project, "Technical Specification Group Services and System Aspects; IP Multimedia Subsystem (IMS); Stage 2 (Release 7)," 3GPP TS 23.228 V7.2.0 (Dec. 2005).

Third Generation Partnership Project, "Technical Specification Group Core Network and Terminals; Interworking between the IP Multimedia (IM) Core Network (CN) subsystem and Circuit Switched (CS) networks (Release 7)," 3GPP TS 29.163 V7.1.0 (Dec. 2005).

Third Generation Partnership Project, "Technical Specification Group Core Network and Terminals; Interworking between the IP Multimedia (IM) Core Network (CN) subsystem and Circuit Switched (CS) networks (Release 7)," 3GPP TS 29.163 V7.5.0 (Dec. 2006).

Third Generation Partnership Project, "Technical Specification Group Services and Systems Aspects; Network architecture (Release 7)," 3GPP TS 23.002 V7.0.0 (Dec. 2005).

Third Generation Partnership Project, "Technical Specification Group Services and Systems Aspects; Network architecture (Release 7)," 3GPP TS 23.002 V7.1.0 (Mar. 2006).

Third Generation Partnership Project, "Technical Specification Group Services and Systems Aspects; Combinied Circuit Switched (CS) and IP Multimedia Subsystem (IMS) sessions; Stage 1 (Release 7)," 3GPP TS 22.279 V7.1.0 (Dec. 2005).

METHOD AND APPARATUS FOR SUPPORTING CIRCUIT SWITCHED INTERWORKING

This application is a continuation of U.S. patent application Ser. No. 11/627,432 filed Jan. 26, 2007, which claims priority from U.S. Provisional Patent Application Ser. No. 60/763,639, filed Jan. 31, 2006, which are incorporated by reference as if fully set forth.

FIELD OF INVENTION

The present invention relates to wireless communication and more particularly to interworking between Internet Protocol (IP) multimedia core network subsystem (IMS) voice/video session and a combination of a circuit switched (CS) call and an IMS session.

BACKGROUND

Third Generation Partnership Project (3GPP) is in the process of specifying how to combine a circuit switched (CS) call and an IP multimedia core network subsystem (IMS) session and thus the interworking between such services and sessions. There is a need to provide an interworking between 3GPP IMS voice/video session and a combination of a CS call and an IMS session.

SUMMARY

The invention is related to facilitating a dual mode wireless transmit/receive unit (WTRU) that is capable of supporting both a Circuit Switched (CS) voice call (e.g., Global System For Mobile Communication (GSM)) and an IMS multimedia session simultaneously without any interruption to either sessions/services. The present invention accommodates the growing demands for the reliable GSM-based CS voice calls with the addition of multimedia services. A combined CS and IMS session is enabled at the WTRU while providing both services independently and while both services are combined at a peer WTRU.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Although the features and elements of the present invention are described in the preferred embodiments in particular combinations, each feature or element can be used alone (without the other features and elements of the preferred embodiments) or in various combinations with or without other features and elements of the present invention.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, a base station (BS) includes but is not limited to a Node-B, site controller, access point (AP) or any other type of interfacing device in a wireless environment.

The present invention handles terminating real-time sessions and calls taking into account different domains (CS, IMS) and different WTRU capabilities (CSI, IMS VoIP, etc.).

Figure 1:
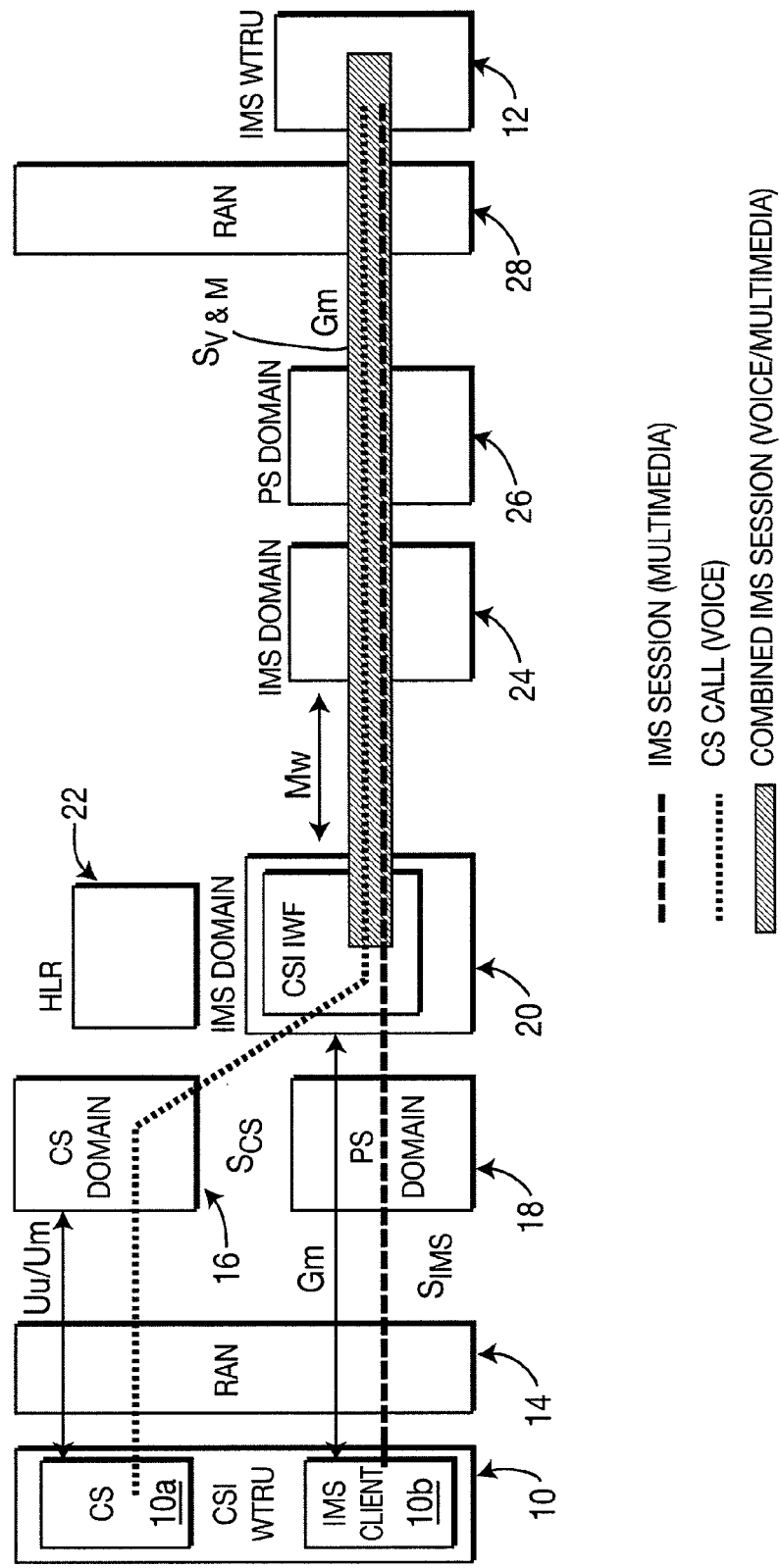
FIG. 1 shows a signal flow diagram for a wireless call session with combined CS and IMS sessions.
Figure 2:
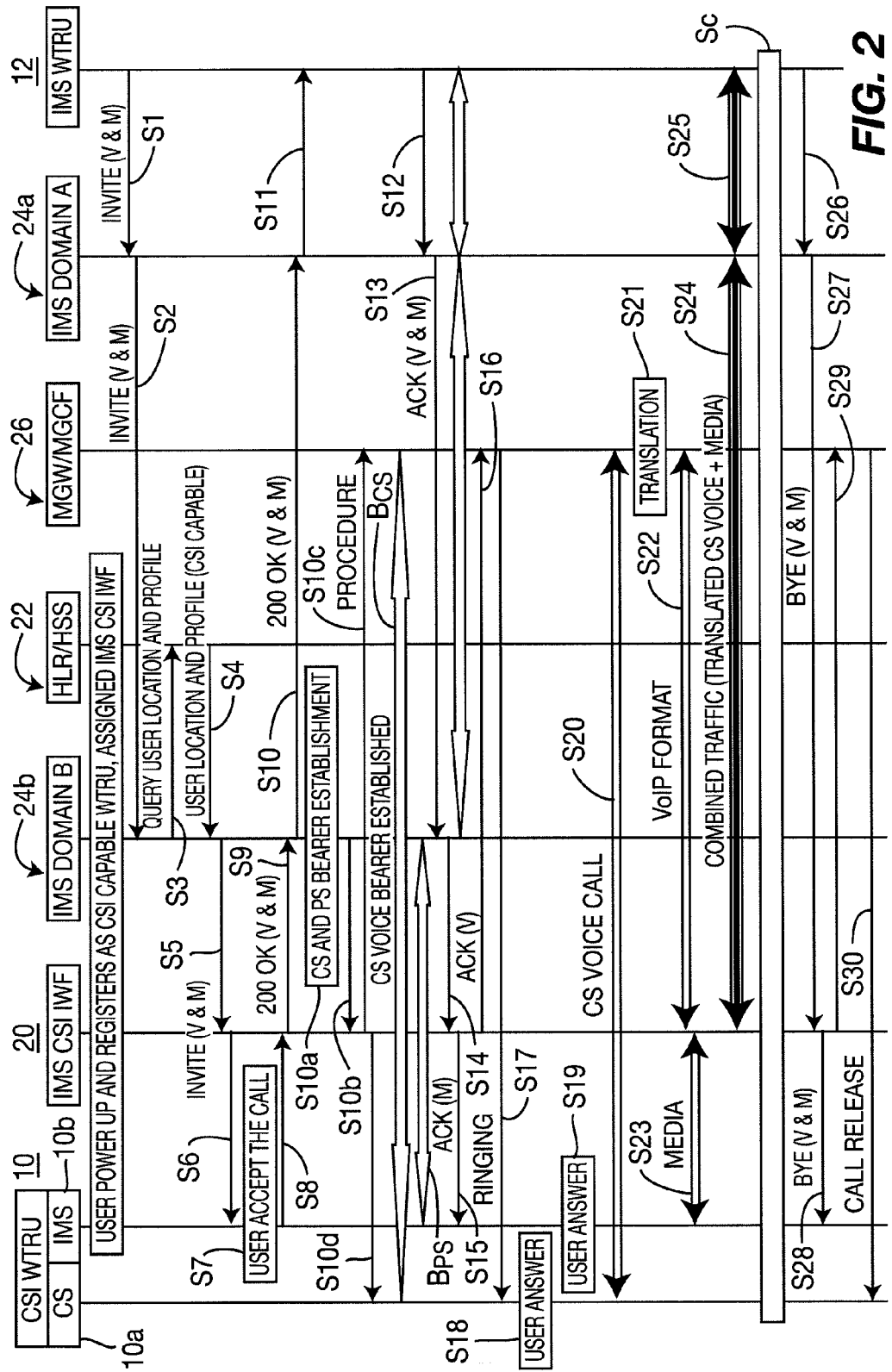
FIG. 2 shows a signaling sequence diagram between two wireless users for establishing a combined CS and IMS session.

Briefly, a multimedia call is initiated from an IMS-only capable WTRU 12 wherein, the invitation may include Voice component (V) and a media component (M) with their respective attributes (see FIGS. 1 and 2). The receiving WTRU 10 has a unique configuration which prefers voice calls over GSM (CS domain). Then, once the IMS side of 10b the receiving WTRU 10 accepts the multimedia call with its components, a CS voice bearer is established between the calling subscriber (an IMS-capable WTRU 12) and the called subscriber (a CS and IMS-capable WTRU 10). The called WTRU 10 acknowledges the voice (V) and multimedia (M) reply (OK) from the calling WTRU 12 through the IMS domain, the Media Gateway (MGW) 26 "rings" the called WTRU 10 and the CS voice call is established when the called WTRU 10 answers. The MGW/MGWF 26 translates the voice call into Voice over IP (VoIP) format. The IMS CSI IWF 20 conveys the media content to the IMS capable portion of the CSI WTRU and supports combined traffic with the IMS domain.

FIG. 1 shows the new Interworking apparatus introduced in an IMS domain in order to control the establishment of a CS voice call combined with an IMS multimedia session between two terminals wherein, one is IMS-only capable and the other is a dual mode (IMS and CS capable) simplified signal flow diagram for a wireless call session between two network transceivers, i.e., a Circuit Switched Interworking (CSI), i.e., a CS and IMS-capable, WTRU 10 and an IMS-capable WTRU 12. WTRU 10 has devices 10a and 10b for respectively supporting CS and IMS, whereas WTRU 12 supports IMS. The domain device 20 combines CS domain content with IMS domain content between the WTRU 10, 12 entities as follows. It should be noted that only two (2) WTRUs are shown in the example of FIG. 1 for simplicity, it being understood that other WTRUs may participate in the combined session.

As shown in FIG. 1, and assuming the session has been set up, the IMS session signal $S_{IMS}$ at the CSI WTRU is sent from the IMS Client entity WTRU 10b, and is then processed by the Radio Access Network (RAN) 14, the PS domain entity 18 and the CSI Interworking Function (CSI IWF) entity 20, where it is combined with the CS signal $S_{CS}$. Gm comprises the interface between the CSI IWF 20, serving as a Proxy-Call Session Control Function (P-CSCF) and IMS portion 10b of WTRU 10. The IWF 20 respectively employs a Serving and a Gateway GPRS Support Node a (GGSN) and a (SGSN) to perform its functions as set forth below.

The CS signal $S_{CS}$ at the CSI WTRU 10, from CS entity 10a, is communicated to RAN 14 and to CS domain entity 16 over a Uu/Um radio interface. Uu is the interface between the UTRAN (UMTS Terrestrial Radio Access Network) and a WTRU utilizing CDMA, and CSI IWF entity 20, which combines the $S_{CS}$ session signal with the IMS session signal $S_{IMS}$ in IMS domain. Um is an air interface reference point for the 3GPP2 air interface. It is a wideband spread spectrum interface that utilizes CDMA (Code Division Multiple Access) technology and satisfies the requirements of a 3G (Third Generation) system and also the evolution of the current TIA (Telecommunications Industry Association)/EIA (Electronics Industry Association) 95-B family of standards.

The combined CS/IMS content signal $S_{V\&M}$ is transmitted in both directions between the two network transceivers, i.e., WTRUs 10 and 12 and is made possible by CSI WF 20.

Making reference to FIG. 2, wherein like elements in FIGS. 1 and 2 are designated by like numerals, there is shown a signalling sequence diagram between the CSI WTRU 10 and the IMS WTRU 12.

The combined session is initiated at step $S_1$ by IMS capable WTRU 12, sending an Invite to IMS Domain A 24a for a combined V and M session. The IMS domain is Session Initiation Protocol (SIP)-based and the Invite is an SIP message. The (V and M) Invite is sent to IMS domain B function device 24b at $S_2$. Device 24b queries Home Location Register/Home Subscriber Server (HLR/IHSS) 22 for location and profile, at $S_3$. It is assumed that the WTRU 10, at $S_0$, has previously powered up and registered as a CSI capable WTRU and has been assigned an IMS CSI IWF.

HLR/HSS 22, at $S_4$, provides the requested location and profile (CSI capable) to device 24b, which sends the V&M Invite to IMS CSI IWF 20 at $S_5$, which forwards the Invite to IMS capable portion 10b, at $S_6$.

WTRU 10 accepts the Invite at $S_7$ and sends a 200 OK (V&M) to IWF 20, at $S_8$. IWF 20 sends the OK to IMS domain B at $S_9$, which forwards the OK to IMS domain A 24, at $S_{10}$ and initiates establishment of CS and PS radio bearers $B_{CS}$ and $B_{PS}$ at $S_{10a}$, employing procedural steps $S_{10b}$, $S_{10c}$ and $S_{10d}$ respectively to IWF 20, MGW/MGW 26 and CSI portion 10a of WTRU 10. IMS domain A 24 sends the OK to WTRU 12 at $S_{11}$. The CS voice bearer $B_{CS}$ is established between MGW/MGCF 26 CS portion 10a. The PS voice bearer $B_{PS}$ is established between IMS portion 10b and IMS Domain B 24b.

WTRU 12, at $S_{12}$, acknowledges the OK and sends an ACK (V&M) to IMS 24A, which sends it to IMS 24B, at $S_{13}$. IMS 24B forwards the ACK (V&M) to IWF 20, at $S_{14}$, which forwards only the ACK (M) to IMS portion 10b of WTRU 10 and forwards only ACK (V) IM to MGW/MGCF 26, at $S_{16}$.

MGW/MGCF 26 sends a Ringing condition to CS portion 10a of WTRU 10, at $S_{17}$ to initiate the voice portion of the combined session. CS 10a of WTRU 10 answers the Ringing at $S_{18}$. WTRU 10 also answers the ACK (M) message at S.sub.19.

The CS voice call session S20 extends between WTRU 10 and MGW/MGCF 26. MGW/MGCF 26 translates the CS voice into Voice over IP (VoIP) format at $S_{21}$ to provide a VoIP session between MGW/MGCF 26 and IWF 20, at $S_{22}$.

The media content, S23, is set up between IWF 20 and IMS portion 10b Of WTRU 10. IWF 20, at $S_{24}$, combines the translated CS voice (i.e., VoIP) and media received from WTRU 10 and sends it to WTRU 12 through IMS domain 24A, which conveys the combined session to and receives it from WTRU 12, at $S_{25}$, the combined session, represented by $S_C$, continuing until WTRU terminates the session, sending a BYE (V&M) to IMS A 24A at $S_{26}$, which forwards the BYE to IWF 20, at $S_{27}$. IWF 20 sends the BYE to IMS portion 10a of WTRU 10 at $S_{28}$ and MGW/MGCF 26 at $S_{29}$, which releases the combined session, at $S_{30}$.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a first wireless transmit/receive unit (WTRU) for communication with a second WTRU via a wireless network, the first WTRU being configured to support a circuit switched (CS) voice call and an IP multimedia core network subsystem (IMS), the method comprising:
   receiving a Session Initiation Protocol (SIP) Invite message that indicates a request for the first WTRU to participate in a combined CS and IMS session with the second WTRU, wherein the combined CS and IMS session includes a CS call and a PS session at the first WTRU, and a voice over IP (VoIP) call at the second WTRU; and
   sending a SIP OK message to the second WTRU in response to the SIP Invite message.

2. The method of claim 1, further comprising:
   sending voice and data content to the second WTRU via the combined CS and IMS session.

3. The method of claim 1, further comprising:
   receiving a message to initiate establishment of a packet-switched (PS) bearer for the IMS session of the combined session.

4. The method of claim 1, further comprising:
   receiving a message to initiate establishment of a CS bearer for the CS session of the combined session.

5. The method of claim 1, further comprising:
   receiving a SIP BYE message to initiate a release of the combined session.

6. A wireless transmit/receive unit (WTRU) in a wireless communication with a second WTRU via a wireless network, the WTRU comprising:
   a circuit switched (CS) domain device configured to process a voice call;
   an IP multimedia core network subsystem (IMS) domain device configured to:

process a media content session,
receive a Session Initiation Protocol (SIP) Invite message that indicates a request for the WTRU to participate in a combined CS and IMS session with the second WTRU, wherein the combined CS and IMS session includes a CS call and a PS session at the WTRU, and a voice over IP (VoIP) call at the second WTRU, and
send an SIP OK message to the second WTRU in response to the SIP Invite message.

7. The dual mode WTRU of claim 1, wherein the IMS domain device is further configured to send data associated with the IMS session of the combined session.

8. The method of claim 1, wherein the IMS domain device is further configured to receive a message to initiate establishment of a packet-switched (PS) bearer for the IMS session of the combined session.

9. The method of claim 1, wherein the CS domain device is further configured to a message to initiate establishment of a CS bearer for the CS session of the combined session.

10. The method of claim 1, wherein the IMS domain device is further configured to receive a SIP BYE message to initiate a release of the combined session.

* * * * *

UNITED STATES PATENT AND TRADEMARK OFFICE
CERTIFICATE OF CORRECTION

PATENT NO. : 8,553,682 B2
APPLICATION NO. : 13/349321
DATED : October 8, 2013
INVENTOR(S) : Kamel M. Shaheen It is certified that error appears in the above-identified patent and that said Letters Patent is hereby corrected as shown below:

ON THE TITLE PAGE

At Item 56 "U.S. Patent Documents", at second line, insert therefor
--2004/0029615 2/2004 Gerry et al.--.

At Item 56 "Foreign Patent Documents", at first line, insert therefor
--EP 1 370 056 12/2003--.

IN THE CLAIMS

In claim 9, at column 5, line 19, after the words "configured to", insert therefor --receive--.

Signed and Sealed this
Thirtieth Day of June, 2015

Michelle K. Lee
*Director of the United States Patent and Trademark Office*